April 23, 1929.  C. O. GUERNSEY  1,710,616
PASSENGER VEHICLE BODY
Filed Nov. 3, 1924   7 Sheets-Sheet 1

April 23, 1929.

C. O. GUERNSEY 1,710,616

PASSENGER VEHICLE BODY

Filed Nov. 3, 1924

Inventor-
Charles O. Guernsey.
by his Attorneys.

April 23, 1929.  C. O. GUERNSEY  1,710,616
PASSENGER VEHICLE BODY
Filed Nov. 3, 1924   7 Sheets-Sheet 4

Inventor:-
Charles O. Guernsey.
by his Attorneys,

April 23, 1929.  C. O. GUERNSEY  1,710,616
PASSENGER VEHICLE BODY
Filed Nov. 3, 1924  7 Sheets-Sheet 5
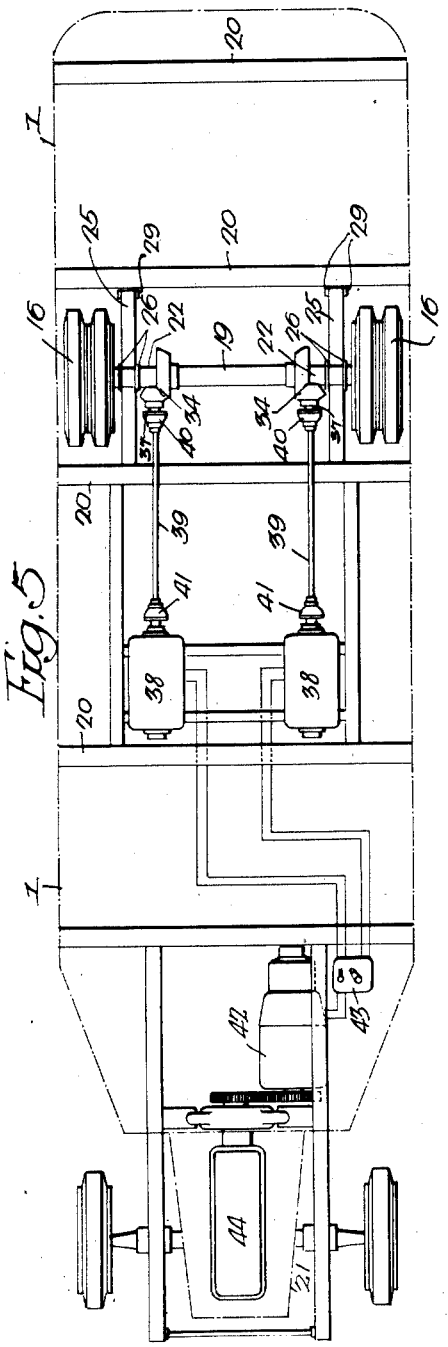
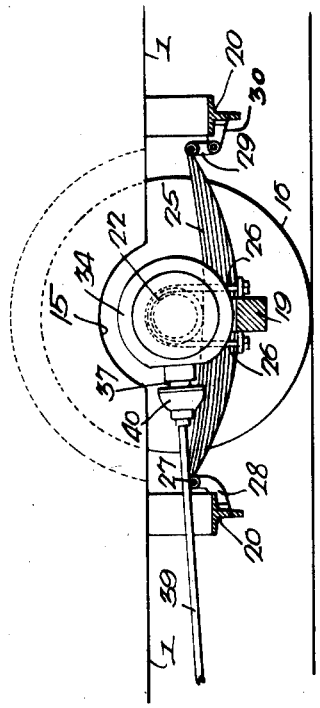
Inventor-
Charles O. Guernsey.
by his Attorneys-

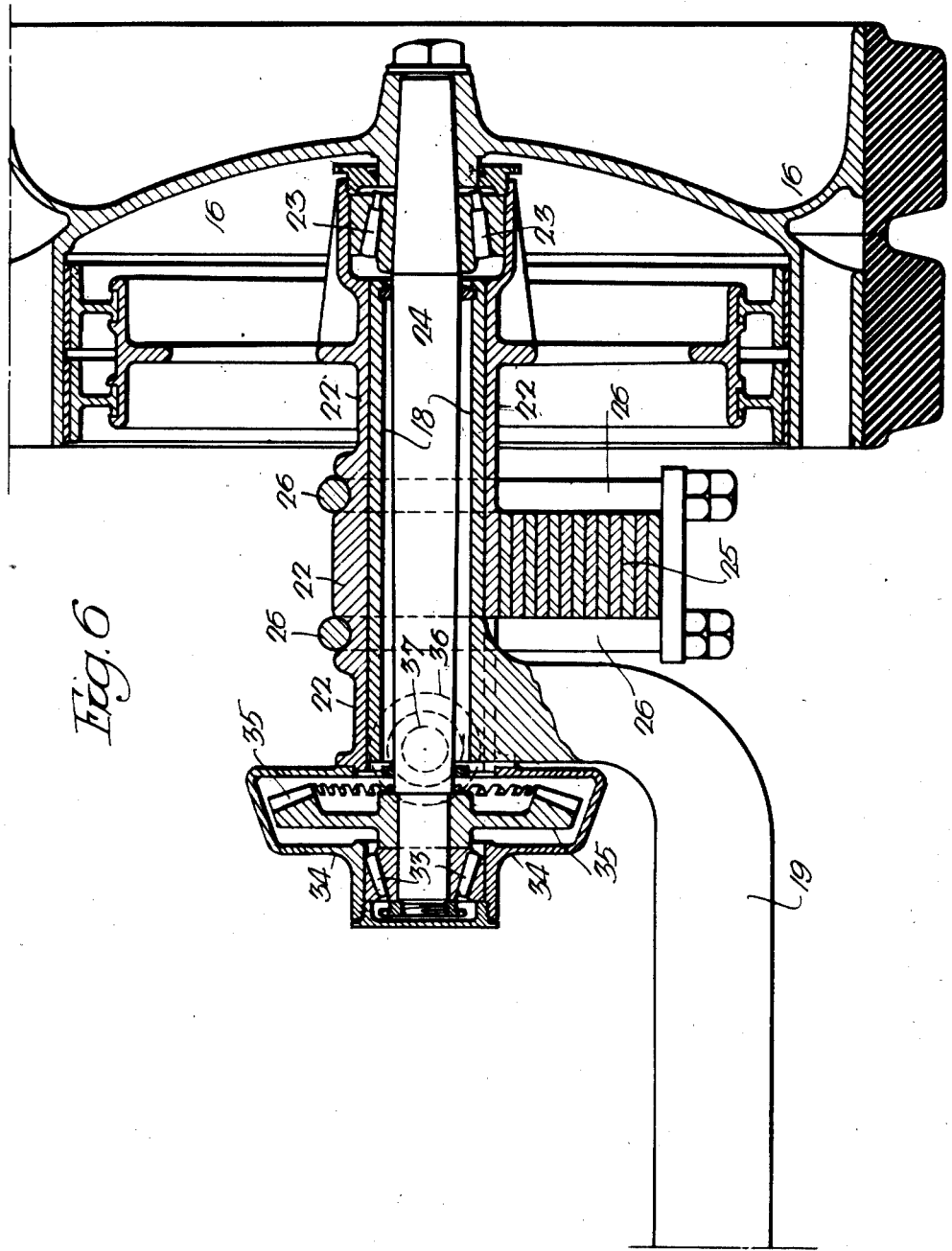

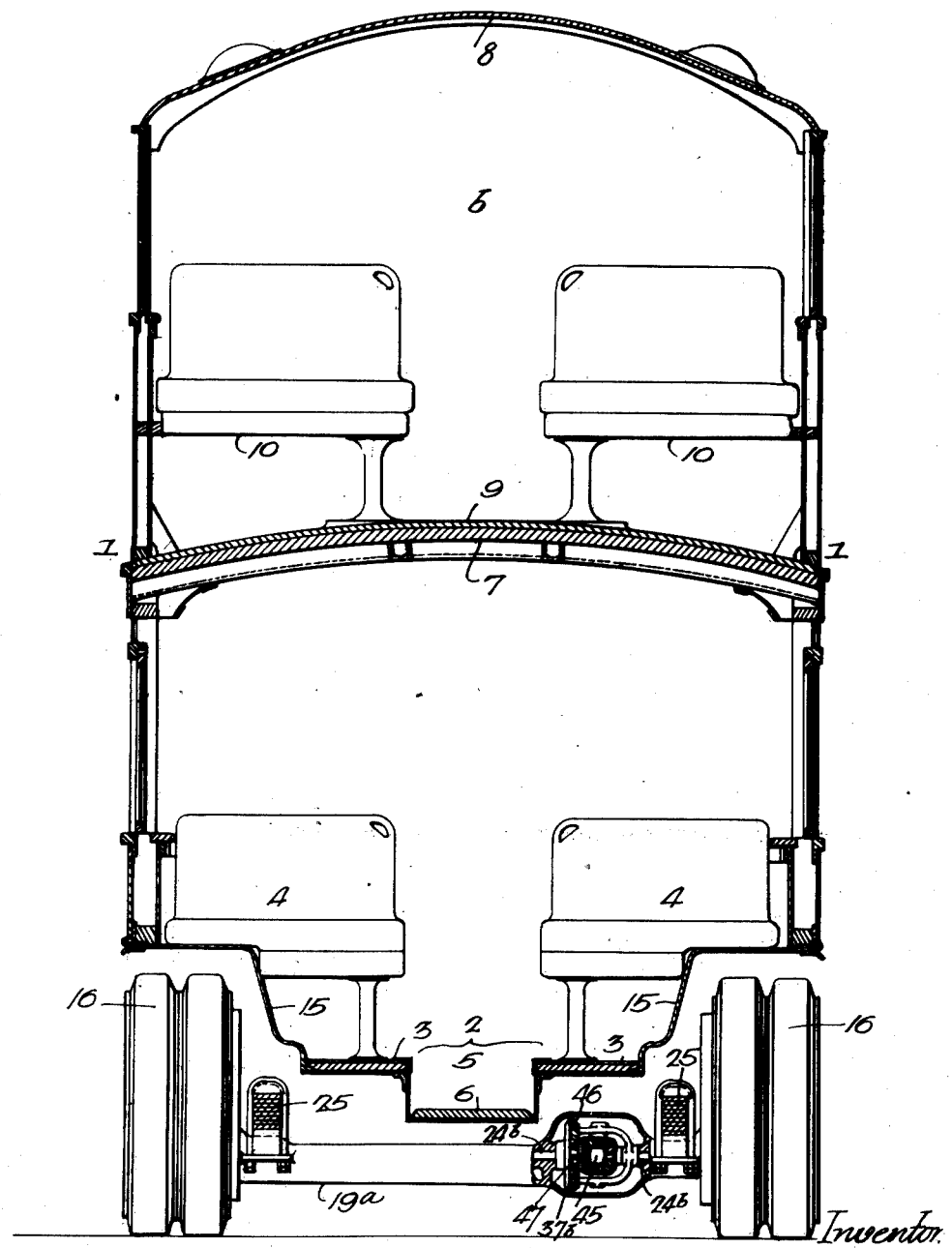

Patented Apr. 23, 1929.

1,710,616

UNITED STATES PATENT OFFICE.

CHARLES O. GUERNSEY, OF PHILADELPHIA, PENNSYLVANIA.

PASSENGER VEHICLE BODY.

Application filed November 3, 1924. Serial No. 747,645.

My invention relates to certain improvements in omnibuses, and other passenger vehicles, having an upper deck and a lower deck.

One object of the invention is to construct the omnibus so that its height is reduced and the center of gravity is lowered—reducing the weight and the first cost of construction—and also providing an entrance for passengers, due to the fact that the aisle of the lower deck is much lower than the floor under the seat sections.

Another object of the invention is to depress the floor of the longitudinal aisle of the lower deck in order to reduce the height of the ceiling of the lower deck, thus reducing the height of the entire vehicle.

A further object of the invention is to construct the driving mechanism so that the center aisle can be depressed below the level of the floor.

A still further object of the invention is to provide independent motors for the driving wheels, which are under the control of the operator, the driving mechanism being located under the floor on each side of the depressed aisle.

In the accompanying drawings:

Fig. 5 is a diagrammatic plan view of the generator, controller and motors;

Fig. 6 is an enlarged sectional view, showing a detail of one of the rear driving wheels;

Fig. 7 is a longitudinal sectional view, showing the rear axle and the supporting springs for the body; and Fig. 8 is a sectional elevation, illustrating the depressed aisle and a motor drive on one side only of the center of the omnibus.

Figure 1:
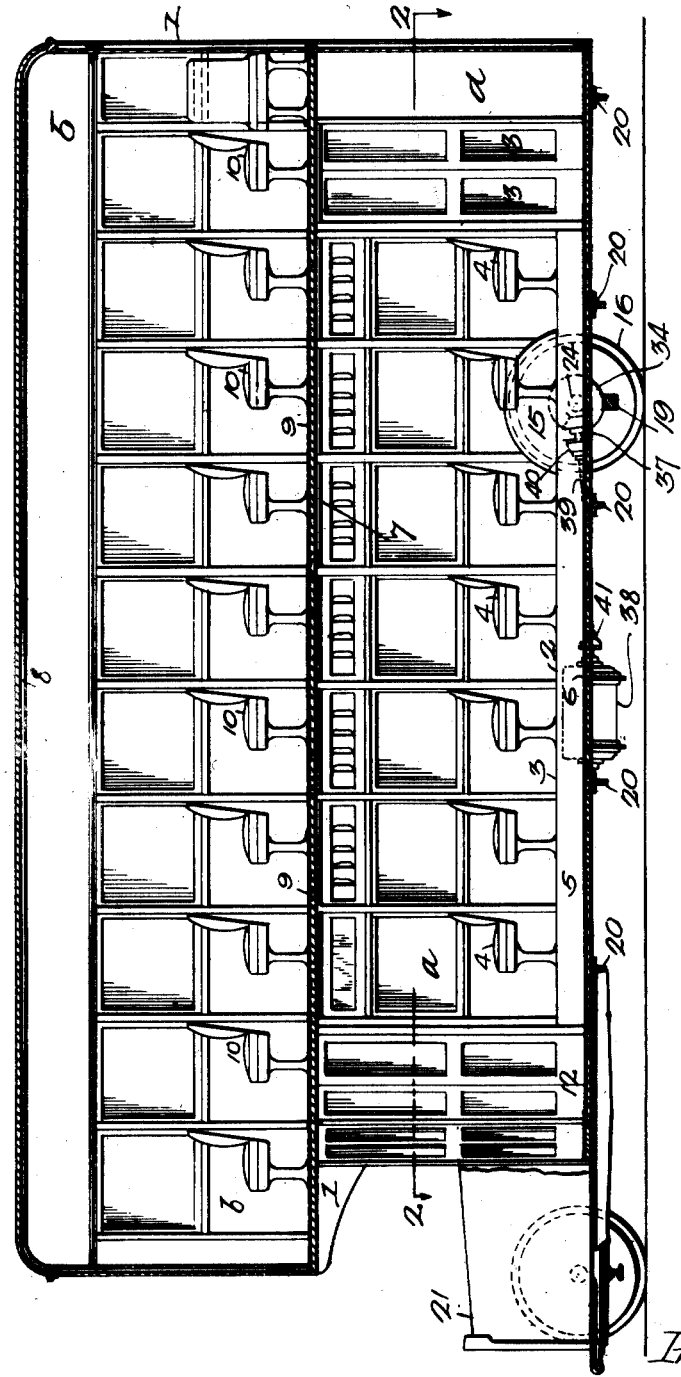
Fig. 1 is a longitudinal sectional view on the line 1—1, Fig. 2, of an omnibus illustrating my invention.
Figure 2:
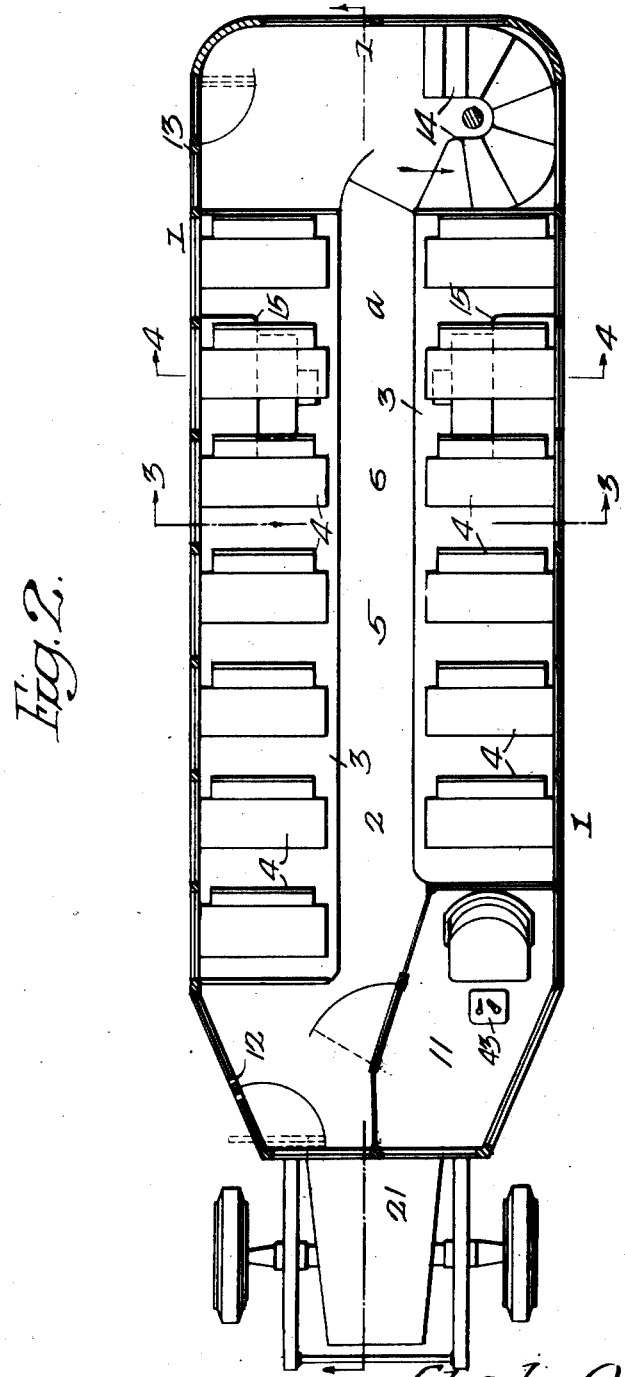
Fig. 2 is a sectional plan view on the line 2—2, Fig. 1.
Figure 3:
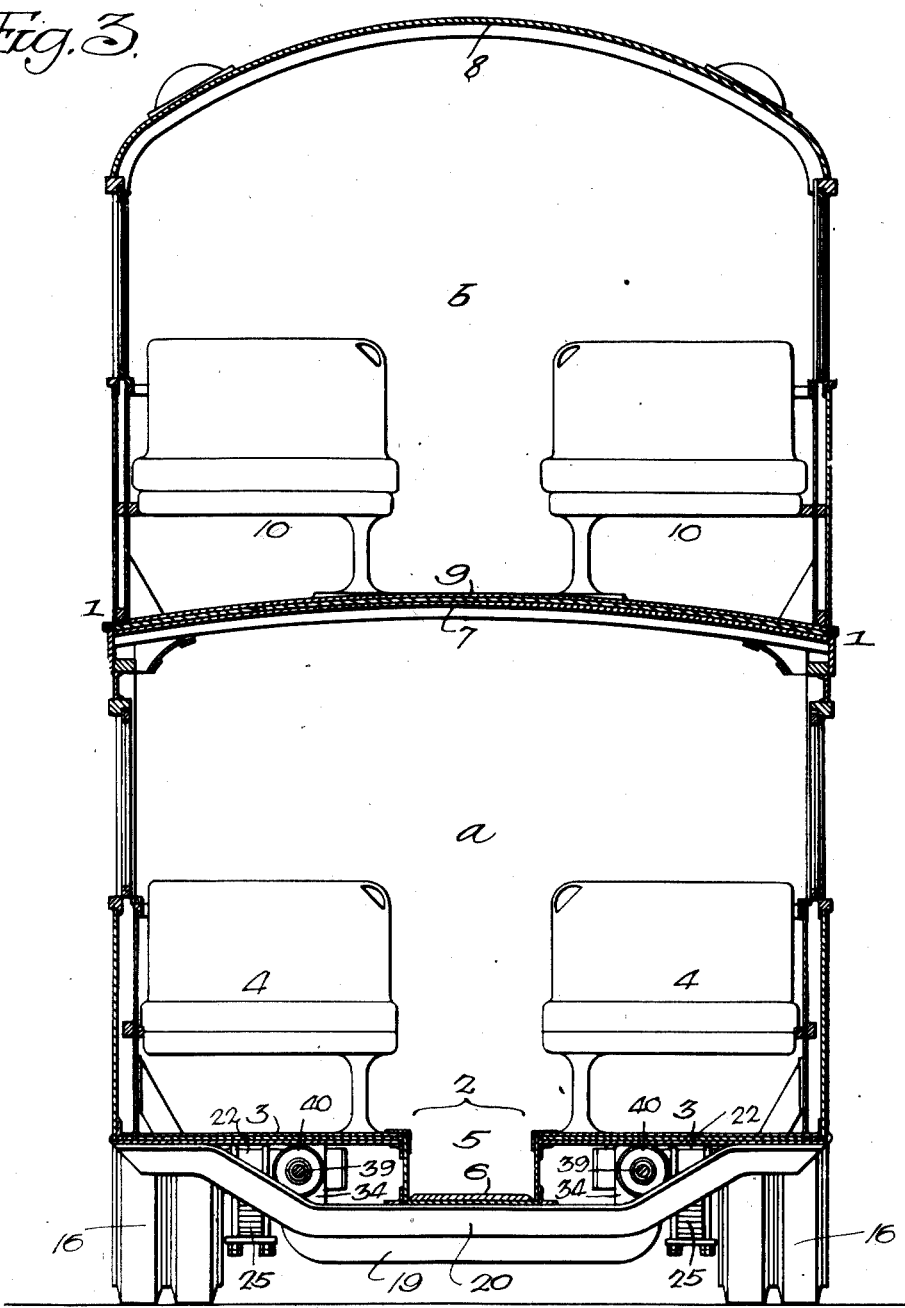
Fig. 3 is a transverse sectional view on the line 3—3, Fig. 2.

Referring to the drawings, 1 is the body of an omnibus having a lower deck $a$ and an upper deck $b$. 2 is the floor of the lower deck having portions 3 at each side, on which the seat structures 4 are located. Between the portions 3—3 is a depressed aisle 5, the floor 6 of which is a considerable distance below the portions 3 of the floor 2.

The ceiling 7 of the lower deck $a$ is of sufficient height to allow a person to pass through the aisle, but the height is not sufficient to allow a person to stand upright on the portions 3 of the floor. A passenger on taking a seat, or on leaving it, stoops sufficiently to clear the ceiling.

The roof 8 of the upper section may be any height from the floor 9 of the upper section, as desired. In the present instance, the seat sections 10 of the upper deck are located at each side of the center to form a longitudinal aisle throughout the length of the omnibus, as shown clearly in Fig. 1.

At the forward end of the body is a motorman's station 11, which is level with the portions 3 of the lower deck floor. At the opposite side are ingress and egress doors 12. At the rear of the lower deck are exit doors 13, which can be used in an emergency. At the opposite side is a spiral stairway 14, which leads to the upper deck.

The floor above the rear, or driving, axle of the omnibus is shaped as at 15 (as shown clearly in Fig. 4) in order to clear the wheels 16, springs 25, and the driving mechanism. The axle 19 is depressed to clear the depressed aisle.

The portions 15 of the body, which are shaped to give clearance to the wheels and to the driving mechanism, are made, preferably, of sheet metal, and conform to the shape of the wheels, as illustrated in Fig. 1. Shaped, transverse braces 20 are located at intervals throughout the length of the omnibus.

The braces 20 extend from side to side of the vehicle and under the depressed aisle, and as the depressed portion of the floor forms a longitudinal girder, and as the transverse braces extend under the depressed portion of the floor and are secured to the underside of the side portions 3 of the floor near their outer edges, a very rigid and comparatively light structure is obtained.

At the forward end of the structure is a hood 21, which encloses the motor. In the present instance, the upper deck overhangs the motor (as shown in Fig. 1), although the general design of the omnibus body may be modified without departing from the essential features of the invention.

Figure 4:
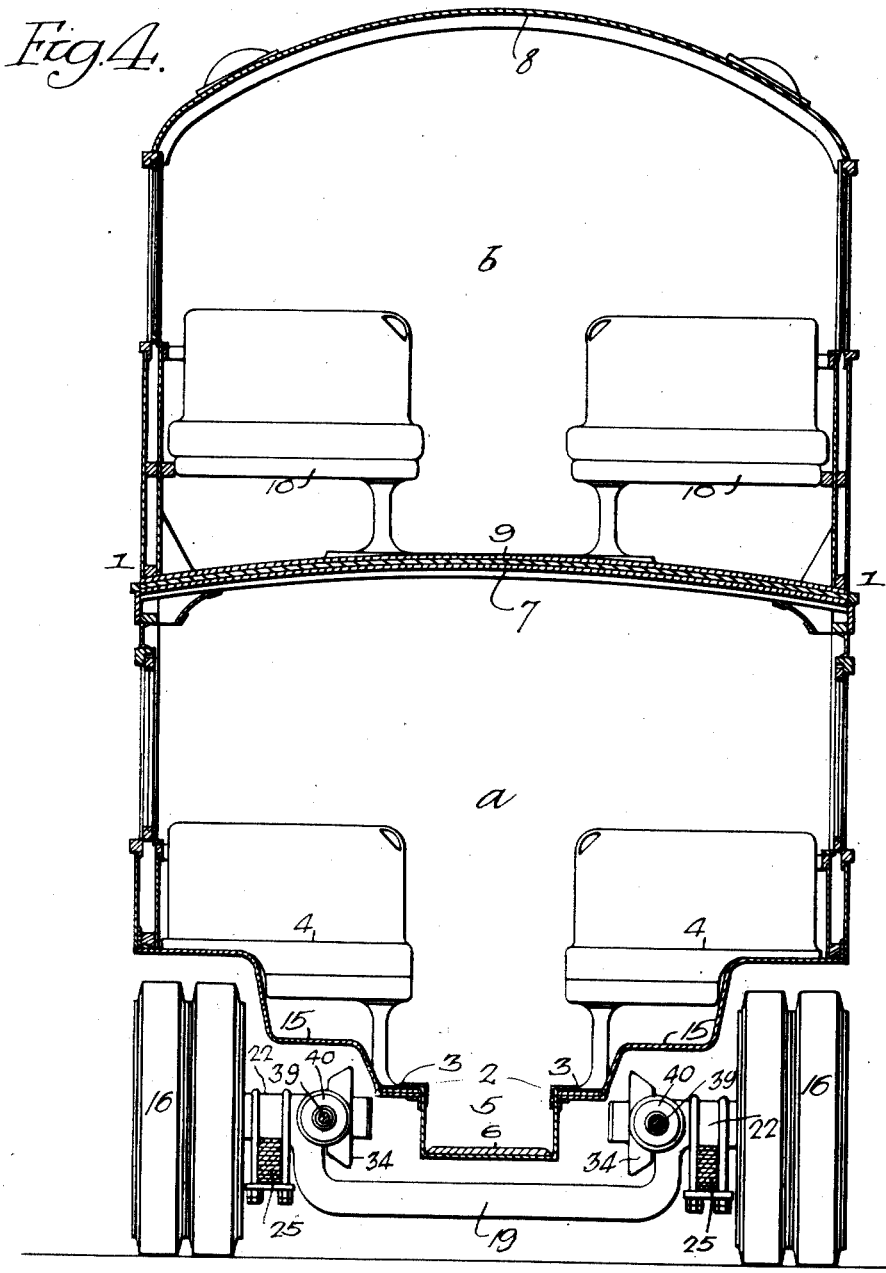
Fig. 4 is a sectional view on the line 4—4, Fig. 2.

As illustrated in Figs. 4, 5 and 6 of the drawings, the axle 19, on which the driving wheels 16 are mounted, is depressed in order to clear the floor of the depressed aisle. The axle 19 has a tubular portion 18, on which is mounted a housing 22 that extends into the wheel 16, as illustrated in Fig. 6. At the extreme end of the housing is a roller bearing 23, of any suitable type, for a short driving shaft 24, which extends through the tubular portion 18 of the axle 19. The end of this shaft is tapered and is secured to the wheel 16, as shown in Fig. 6.

The springs 25 are secured to the housings 22 by U-shaped spring clips 26. One end of each spring is pivotally connected, as at 27, to a bracket 28 on one of the transverse braces 20, while the other end is connected by a shackle 29 to a bracket 30 on one of the transverse braces.

On the inner end of each shaft 24 is a bevel gear wheel 35, which meshes with a bevel gear wheel 36 on the driving shaft 37. The inner end of the shaft and the gear wheels are enclosed within a housing 34. A roller bearing 33 is located in the housing to support the inner end of the shaft 24.

While one method of driving the shaft is described, the driving mechanism may be modified without departing from the spirit of the invention.

There is one of these driving shafts on each side of the omnibus to allow clearance for the depressed aisle.

The driving shafts 37 are connected to the shafts of electric motors 38 by shafts 39, having universal joints 40 and 41. The electric motors 38 derive current from the generator 42 through a controller 43. The generator is located at the forward end of the omnibus, as illustrated in Fig. 5, and is driven from an internal combustion engine 44 that is located under the hood 21.

By the arrangement illustrated in Fig. 5, clearance is provided for the central, depressed aisle, as the driving wheels 16 are driven from independent motors 38.

In Fig. 8 a modification is illustrated, in which the depressed axle 19ª is hollow. The two shafts 24ᵇ are connected by differential gearing 45, driven by a bevel gear wheel 46, which meshes with a gear wheel 47 on a single longitudinal shaft 37ᵇ.

The invention is illustrated as applied to a vehicle of the omnibus type, having an upper deck and a lower deck. It will be understood, however, that the invention can be applied to a vehicle having a single deck, when it is desired to provide a vehicle with a low roof.

I claim:

1. The combination in a passenger vehicle, of a body portion; a floor extending substantially the full width of the car and having a centrally arranged narrow depressed aisle extending substantially the full length of the vehicle body; and a series of transverse seats arranged on the side portions of the floor, said seats being raised sufficiently above the floor so as to provide a clear space between the seats and the floor.

2. The combination in a passenger vehicle, of a body having a floor extending substantially the full width of the car; a depressed aisle at the center of said floor, the sides of said floor being of a greater width than the aisle, the floor being of metal, the depressed aisle forming a longitudinal channel girder; and transverse braces located at intervals throughout the length of the vehicle and extending under the depressed aisle and secured to the side portions of the floor near their outer edges.

CHARLES O. GUERNSEY.